US011178831B2

(12) United States Patent
Gungl et al.

(10) Patent No.: US 11,178,831 B2
(45) Date of Patent: Nov. 23, 2021

(54) INTELLIGENT WATERING SYSTEM

(71) Applicant: HUSQVARNA AB, Huskvarna (SE)

(72) Inventors: Johannes Gungl, Ulm (DE); Florian Soor, Günzburg (DE); Horst Schnürle, Neu-Ulm (DE); Philipp Bolliger, Zollikon (CH)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 16/092,131

(22) PCT Filed: Apr. 8, 2016

(86) PCT No.: PCT/EP2016/057770
§ 371 (c)(1),
(2) Date: Oct. 8, 2018

(87) PCT Pub. No.: WO2017/174149
PCT Pub. Date: Oct. 12, 2017

(65) Prior Publication Data
US 2019/0090440 A1    Mar. 28, 2019

(51) Int. Cl.
*A01G 25/16* (2006.01)

(52) U.S. Cl.
CPC ......... *A01G 25/165* (2013.01); *A01G 25/167* (2013.01); *G05B 2219/2625* (2013.01)

(58) Field of Classification Search
CPC ........ A01G 25/16; A01G 20/30; A01G 22/00; A01G 25/00; A01G 25/02; G05B 15/02;
(Continued)

(56) References Cited

U.S. PATENT DOCUMENTS 4,646,224 A    2/1987  Ransburg et al.
5,023,787 A *  6/1991  Evelyn-Veere ........ A01G 25/16
                                                        239/69

(Continued)

FOREIGN PATENT DOCUMENTS

CN        1951170 A     4/2007
CN      201316120 Y     9/2009
(Continued)

OTHER PUBLICATIONS

International Search Report and Written Opinion for International Application No. PCT/EP2016/057770 dated Jan. 3, 2017.
(Continued)

*Primary Examiner* — Darrin D Dunn
(74) *Attorney, Agent, or Firm* — Burr & Forman, LLP

(57) ABSTRACT

A system (10) may include sensor equipment (30) including one or more sensors (140, 142) disposed on a parcel of land, watering equipment (20) disposed on the parcel and configured to selectively apply water to the parcel, and a gateway (40) configured to provide for communication with the sensor equipment (30) and the watering equipment (20). The watering equipment (20) may include a watering pump (120), the watering pump (120) being operably coupled to a water source (100) and a water line (110) to alternately couple the water source (100) to and isolate the water source (100) from the water line (110), and processing circuitry (160). The processing circuitry (160) may be configured to determine an operational mode of the watering pump (120) and direct the watering pump (120) to operate in accordance with the operational mode.

17 Claims, 7 Drawing Sheets

(58) Field of Classification Search
CPC .... G05B 2219/2625; G05B 2219/2642; G05B 19/4185; G05B 2219/15117; G05B 2219/2229; G05B 2219/2231; G05B 2219/25232; G05B 2219/25314; G05B 2219/25484; H04L 67/125; H04L 12/2818; Y04S 10/54; Y04S 20/227
See application file for complete search history.

(56) References Cited

U.S. PATENT DOCUMENTS

| | | | |
|---|---|---|---|
| 5,193,744 A | 3/1993 | Goldstein | |
| 5,229,937 A * | 7/1993 | Evelyn-Veere | A01G 25/16 700/284 |
| 5,251,153 A * | 10/1993 | Nielsen | G06F 3/0489 137/551 |
| 6,491,062 B1 * | 12/2002 | Croft | F17D 5/06 137/624.11 |
| 6,735,549 B2 * | 5/2004 | Ridolfo | G05B 23/0283 701/29.4 |
| 6,738,748 B2 * | 5/2004 | Wetzer | G06Q 10/06 705/7.21 |
| 6,823,239 B2 * | 11/2004 | Sieminski | A01G 25/167 239/69 |
| 6,829,542 B1 * | 12/2004 | Reynolds | F04B 43/0081 702/34 |
| 6,839,781 B1 * | 1/2005 | Kanazawa | G06F 1/3203 710/67 |
| 6,898,467 B1 * | 5/2005 | Smith | G05B 15/02 700/20 |
| 6,922,558 B2 * | 7/2005 | Delp | G05B 19/0428 455/420 |
| 7,010,396 B2 * | 3/2006 | Ware | G05B 19/0421 700/284 |
| 7,222,454 B1 | 5/2007 | Chen | |
| 7,225,037 B2 * | 5/2007 | Shani | G05B 19/056 700/18 |
| 7,280,892 B2 * | 10/2007 | Bavel | A01G 7/00 239/69 |
| 7,283,914 B2 * | 10/2007 | Poorman | G01H 1/00 702/33 |
| 7,359,769 B2 | 4/2008 | Bailey et al. | |
| 7,540,433 B2 | 6/2009 | Fleming et al. | |
| 8,070,605 B2 * | 12/2011 | Tien | G07F 17/3258 463/40 |
| 8,086,477 B2 * | 12/2011 | Gross | G06Q 10/06 705/7.12 |
| 8,136,738 B1 * | 3/2012 | Kopp | F24F 11/30 236/51 |
| 8,208,611 B2 * | 6/2012 | Nevernov | H04M 11/007 379/102.03 |
| 8,219,254 B2 * | 7/2012 | O'Connor | A01G 25/16 137/78.3 |
| 8,255,348 B2 * | 8/2012 | Kelly | G06N 20/00 706/46 |
| 8,485,796 B2 | 7/2013 | Gilpatrick | |
| 8,527,549 B2 * | 9/2013 | Cidon | G06F 16/178 707/802 |
| 8,649,907 B2 | 2/2014 | Ersavas | |
| 8,839,135 B2 * | 9/2014 | Vander Griend | G06Q 50/00 715/771 |
| 8,924,101 B1 * | 12/2014 | Schiltz | G05B 15/02 417/44.2 |
| 8,977,400 B1 | 3/2015 | Porter et al. | |
| 9,476,419 B2 * | 10/2016 | Estelle | F04B 49/00 |
| 9,750,447 B2 * | 9/2017 | Lemmens | A61B 5/7475 |
| 9,888,081 B1 * | 2/2018 | Farinelli, Jr. | H04W 40/20 |
| 10,225,996 B1 * | 3/2019 | Kremicki | A01G 25/167 |
| 2002/0014539 A1 * | 2/2002 | Pagano | A01G 25/167 239/1 |
| 2002/0045976 A1 * | 4/2002 | Kodama | G05B 19/0428 702/184 |
| 2002/0088176 A1 | 7/2002 | Gergek | |
| 2003/0121937 A1 * | 7/2003 | Black | B67D 1/06 222/129.1 |
| 2003/0126295 A1 * | 7/2003 | Doherty | A01G 25/167 709/249 |
| 2003/0171895 A1 * | 9/2003 | Harris | G05B 23/0221 702/183 |
| 2004/0051467 A1 * | 3/2004 | Balasubramaniam | H05B 37/0272 315/149 |
| 2004/0073468 A1 * | 4/2004 | Vyas | G06Q 10/0631 705/7.13 |
| 2005/0090936 A1 * | 4/2005 | Hitt | A01G 25/167 700/284 |
| 2005/0165582 A1 * | 7/2005 | Tsung | G06Q 10/06 702/184 |
| 2006/0104232 A1 * | 5/2006 | Gidwani | H04W 28/18 370/328 |
| 2006/0250578 A1 * | 11/2006 | Pohl | G06F 3/0238 351/210 |
| 2006/0276999 A1 * | 12/2006 | Beck | E21B 43/126 702/182 |
| 2007/0021943 A1 * | 1/2007 | Tsung | G06Q 10/06 702/184 |
| 2007/0069850 A1 * | 3/2007 | Anderson, Jr. | G05B 15/02 340/3.51 |
| 2007/0130093 A1 * | 6/2007 | Haji-Valizadeh | E03B 7/02 705/413 |
| 2007/0162188 A1 * | 7/2007 | Bailey | A01G 25/16 700/284 |
| 2007/0282486 A1 * | 12/2007 | Walker | A01G 25/16 700/284 |
| 2007/0299706 A1 * | 12/2007 | Galt | B22D 17/32 705/7.11 |
| 2008/0091289 A1 * | 4/2008 | Gozzi | G06Q 10/06 700/100 |
| 2008/0142614 A1 * | 6/2008 | Elezaby | A01G 25/16 239/69 |
| 2008/0167931 A1 * | 7/2008 | Gerstemeier | G06Q 10/06 705/7.22 |
| 2008/0217419 A1 * | 9/2008 | Ehlers | G08B 21/20 236/44 C |
| 2008/0285628 A1 * | 11/2008 | Gizis | A63H 30/04 375/135 |
| 2009/0019140 A1 * | 1/2009 | Lobig | H04L 41/0668 709/223 |
| 2009/0041478 A1 * | 2/2009 | Kamisuwa | G03G 15/55 399/8 |
| 2009/0099701 A1 * | 4/2009 | Li | A01G 25/16 700/284 |
| 2009/0150001 A1 * | 6/2009 | Fekete | G05B 15/02 700/284 |
| 2009/0276102 A1 * | 11/2009 | Smith | A01G 25/16 700/284 |
| 2009/0281672 A1 * | 11/2009 | Pourzia | A01G 25/167 700/284 |
| 2009/0289757 A1 * | 11/2009 | Ballard | G07C 5/008 340/3.1 |
| 2009/0293354 A1 * | 12/2009 | Goldberg | A01G 25/167 47/66.6 |
| 2010/0023172 A1 * | 1/2010 | Malinowski | G05B 15/02 700/283 |
| 2010/0161098 A1 * | 6/2010 | Lilly | G06Q 10/06 700/101 |
| 2010/0303654 A1 * | 12/2010 | Petersen | F04B 35/06 417/423.7 |
| 2011/0111700 A1 * | 5/2011 | Hackett | A01G 25/16 455/41.2 |
| 2011/0137472 A1 * | 6/2011 | Hitt | A01G 25/167 700/284 |
| 2011/0182204 A1 * | 7/2011 | Goto | H04W 28/18 370/252 |
| 2011/0190948 A1 * | 8/2011 | Fekete | G05B 15/02 700/284 |
| 2011/0231317 A1 * | 9/2011 | Arsac | G06F 21/556 705/50 |

(56) References Cited

U.S. PATENT DOCUMENTS

| | | | |
|---|---|---|---|
| 2011/0301767 A1* | 12/2011 | Alexanian | A01G 25/16 700/284 |
| 2011/0309933 A1* | 12/2011 | Marino | G01S 5/0252 340/539.32 |
| 2012/0005107 A1* | 1/2012 | Lowden | G06Q 10/06 705/305 |
| 2012/0029709 A1* | 2/2012 | Safreno | A01G 25/16 700/284 |
| 2012/0036091 A1* | 2/2012 | Cook | G06Q 50/06 705/412 |
| 2012/0041606 A1* | 2/2012 | Standerfer | A01G 25/16 700/284 |
| 2012/0141301 A1* | 6/2012 | Van Der Spek | F04B 15/02 417/53 |
| 2012/0148419 A1* | 6/2012 | Aspen | F04B 49/065 417/53 |
| 2012/0216881 A1* | 8/2012 | Donoghue | A01G 25/16 137/386 |
| 2012/0254784 A1* | 10/2012 | Vander Griend | G06Q 50/00 715/771 |
| 2012/0265379 A1* | 10/2012 | Chen | B61L 3/006 701/20 |
| 2012/0285539 A1* | 11/2012 | Riley | F03B 13/06 137/1 |
| 2013/0085619 A1* | 4/2013 | Howard | A01G 25/16 700/284 |
| 2013/0129536 A1* | 5/2013 | Robol | F04B 19/00 417/410.1 |
| 2013/0131874 A1* | 5/2013 | Shupe | A01G 25/16 700/284 |
| 2013/0162390 A1 | 6/2013 | Ersavas et al. | |
| 2013/0164149 A1* | 6/2013 | Mehr | F04B 23/04 417/62 |
| 2013/0176139 A1* | 7/2013 | Chau | G01V 3/30 340/854.4 |
| 2013/0191660 A1* | 7/2013 | Pham | G06F 1/266 713/310 |
| 2013/0200171 A1* | 8/2013 | Hartfelder | A01G 25/16 239/1 |
| 2013/0214059 A1 | 8/2013 | Gilpatrick et al. | |
| 2013/0235503 A1* | 9/2013 | Deck | H01H 71/123 361/170 |
| 2013/0269798 A1* | 10/2013 | Wood | A01G 25/167 137/551 |
| 2013/0304277 A1* | 11/2013 | Odate | H04L 67/125 701/1 |
| 2013/0310986 A1* | 11/2013 | Gust | G05D 23/19 700/276 |
| 2013/0325426 A1* | 12/2013 | Richards | G05B 23/0248 703/7 |
| 2014/0005843 A1* | 1/2014 | Thomas | A01G 25/16 700/284 |
| 2014/0095554 A1* | 4/2014 | Thomeer | G06F 16/9535 707/821 |
| 2014/0129039 A1* | 5/2014 | Olive-Chahinian | A01G 25/16 700/284 |
| 2014/0163751 A1* | 6/2014 | Davis | H04L 12/12 700/286 |
| 2014/0222223 A1* | 8/2014 | Horton | G05D 7/0617 700/284 |
| 2014/0229448 A1* | 8/2014 | Chida | H02K 15/02 707/688 |
| 2014/0236868 A1* | 8/2014 | Cook | A01G 25/16 705/412 |
| 2014/0292535 A1* | 10/2014 | Petite | G01D 4/004 340/870.07 |
| 2014/0314062 A1* | 10/2014 | Loebs | H04L 12/2803 370/338 |
| 2015/0032272 A1* | 1/2015 | Neesen | A01G 25/16 700/284 |
| 2015/0100169 A1* | 4/2015 | McKinney | H04L 67/10 700/284 |
| 2015/0105921 A1* | 4/2015 | Shupe | A01G 25/16 700/284 |
| 2015/0108230 A1* | 4/2015 | Cloonan | F24D 19/1009 236/1 B |
| 2015/0236928 A1* | 8/2015 | Drake | H04L 43/0829 709/224 |
| 2015/0356521 A1* | 12/2015 | Sridhar | G06Q 50/04 705/305 |
| 2016/0002942 A1 | 1/2016 | Orlando | |
| 2016/0012702 A1* | 1/2016 | Hart | G08B 21/043 340/584 |
| 2016/0014981 A1 | 1/2016 | Fayazi-Azad | |
| 2016/0031542 A1* | 2/2016 | Yin | F01P 3/207 700/282 |
| 2016/0050860 A1* | 2/2016 | Standerfer | A01G 25/16 700/284 |
| 2016/0100533 A1* | 4/2016 | Bauman | A01G 25/16 700/284 |
| 2016/0104125 A1* | 4/2016 | Chapman | G06Q 10/20 705/305 |
| 2016/0135389 A1* | 5/2016 | Ersavas | A01G 25/167 700/284 |
| 2016/0138388 A1* | 5/2016 | Chau | G01V 3/30 340/854.4 |
| 2016/0219804 A1* | 8/2016 | Romney | A01G 25/16 |
| 2016/0371007 A1* | 12/2016 | Shani | G06F 3/065 |
| 2017/0006111 A1* | 1/2017 | McCoy | H04L 41/0681 |
| 2017/0052515 A1* | 2/2017 | Meusburger | F27D 19/00 |
| 2017/0080640 A1* | 3/2017 | Gould | B29C 66/73172 |
| 2017/0114927 A1* | 4/2017 | Schoonover | F16K 37/0083 |
| 2017/0118037 A1* | 4/2017 | Kitchen | H04L 12/2818 |
| 2017/0127124 A9* | 5/2017 | Wilson | H04L 12/2807 |
| 2017/0270621 A1* | 9/2017 | Fleming | G06Q 10/0635 |
| 2017/0322527 A1* | 11/2017 | Ersavas | G05B 15/02 |
| 2017/0348137 A1* | 12/2017 | Hvid | A61M 3/0258 |
| 2017/0366619 A1* | 12/2017 | Schreter | H04L 67/145 |
| 2018/0011458 A1* | 1/2018 | Aggarwal | G05B 15/02 |
| 2018/0014480 A1* | 1/2018 | Montgomery | A01G 25/16 |
| 2018/0039243 A1* | 2/2018 | Bangalore | G05B 19/04 |
| 2018/0070543 A1* | 3/2018 | Bohler | G01F 23/0007 |
| 2018/0213731 A1* | 8/2018 | Wykman | H04L 67/125 |
| 2018/0299914 A1* | 10/2018 | Caron | G05B 15/02 |
| 2018/0314223 A1* | 11/2018 | Nickerson | A01G 25/16 |
| 2018/0325050 A1* | 11/2018 | Bye | A01G 25/162 |
| 2018/0368339 A1* | 12/2018 | van der Lee | A01G 25/167 |
| 2019/0150381 A1* | 5/2019 | Tennyson | G05B 19/02 |
| 2019/0204802 A1* | 7/2019 | Seely | G06F 9/4498 |
| 2019/0208720 A1* | 7/2019 | Nguyen | A01G 25/00 |

FOREIGN PATENT DOCUMENTS

| | | |
|---|---|---|
| CN | 201450979 U | 5/2010 |
| CN | 201640115 U | 11/2010 |
| CN | 102172195 A | 9/2011 |
| CN | 203087142 U | 7/2013 |
| CN | 203369180 U | 1/2014 |
| CN | 104335882 A | 2/2015 |
| CN | 104756832 A | 7/2015 |
| CN | 104782452 A | 7/2015 |
| CN | 105046924 A | 11/2015 |
| CN | 204884141 U | 12/2015 |
| CN | 108882683 A | 11/2018 |
| DE | 199 23 350 A1 | 4/2000 |
| EP | 2 450 574 A1 | 5/2012 |
| JP | S55-171606 A | 12/1980 |
| JP | S63-181934 A | 7/1988 |
| JP | H01-168214 A | 7/1989 |
| JP | H02-296922 A | 12/1990 |
| JP | H04-58835 A | 2/1992 |
| JP | H06-141710 A | 5/1994 |
| JP | 3045720 U | 2/1998 |
| JP | 2001-275501 A | 10/2001 |
| JP | 2002-27851 A | 1/2002 |
| JP | 2004-283129 A | 10/2004 |
| JP | 2005-245462 A | 9/2005 |
| JP | 2008-104377 A | 5/2008 |
| JP | 2008-148635 A | 7/2008 |
| JP | 2012-147753 A | 8/2012 |

(56) References Cited

FOREIGN PATENT DOCUMENTS

| | | |
|---|---|---|
| JP | 2014-113588 A | 6/2014 |
| JP | 2013-192532 A | 9/2019 |
| KR | 10-2009-0079709 A | 7/2009 |
| KR | 10-2015-0131602 A | 11/2015 |
| KR | 10-2015-0144437 A | 12/2015 |
| RU | 2025953 C1 | 1/1995 |
| WO | 2009/049361 A1 | 4/2009 |
| WO | 2012/003870 A1 | 1/2012 |
| WO | 2015/022672 A2 | 2/2015 |
| WO | 2015/131939 A1 | 9/2015 |
| WO | 2017/174148 A1 | 10/2017 |

OTHER PUBLICATIONS

International Preliminary Report on Patentability for International Application No. PCT/EP2016/057770 dated Jul. 4, 2018.

* cited by examiner

INTELLIGENT WATERING SYSTEM

TECHNICAL FIELD

Example embodiments generally relate to intelligent systems and, more particularly, relate to a system for intelligent watering that includes components configured to facilitate easy interface and operation.

BACKGROUND

Grounds care maintenance tasks may include lawn care and/or gardening tasks related to facilitating growth and manicuring the lawns or gardens that hopefully prosper as a result of those efforts. Facilitating growth has commonly required individuals to focus routine attention on ensuring growing conditions are appropriate for the vegetation being grown, and on providing the necessary care and grooming tasks to further enhance growth.

As technological capabilities have improved, various devices or sensors have been developed that are capable of employment to monitor various aspects of growing conditions. Gardeners have therefore been enabled to employ the sensors or devices in specific locations to monitor and correct, if needed, the growing conditions. However, even with the improvement of monitoring devices or sensors, gardeners are still often required to employ a high degree of manual interaction to place and/or operate the devices or sensors.

BRIEF SUMMARY OF SOME EXAMPLES

Some example embodiments may therefore provide a capability for intelligent control or management of a number of assets in connection with yard maintenance with the assistance or inclusion of a user terminal. Thus, for example, sensor equipment and watering equipment operation (with or without a robotic rover) may be coordinated remotely for efficient gardening and lawn care using a smart watering pump.

In an example embodiment, a system for intelligent control or management of a number of assets in connection with yard maintenance is provided. The system may include sensor equipment including one or more sensors disposed on a parcel of land, watering equipment disposed on the parcel and configured to selectively apply water to the parcel, and a gateway configured to provide for communication with the sensor equipment and the watering equipment. The watering equipment may include a watering pump operably coupled to a water source and a water line to alternately couple the water source to and isolate the water source from the water line, and processing circuitry. The processing circuitry may be configured to determine an operational mode of the watering pump; and direct the watering pump to operate in accordance with the operational mode.

In another example embodiment, a watering pump for intelligent control or management of yard maintenance is provided. The watering pump may be operably coupled to a water source and a water line to alternately couple the water source to and isolate the water source from the water line, and may include processing circuitry. The processing circuitry may be configured to determine an operational mode of the watering pump and direct the watering pump to operate in accordance with the operational mode.

Some example embodiments may improve the ability of operators to maximize the beauty and productivity of their yards and gardens, but do so in a user friendly and intuitive way.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6, which includes

DETAILED DESCRIPTION

Figure 1:
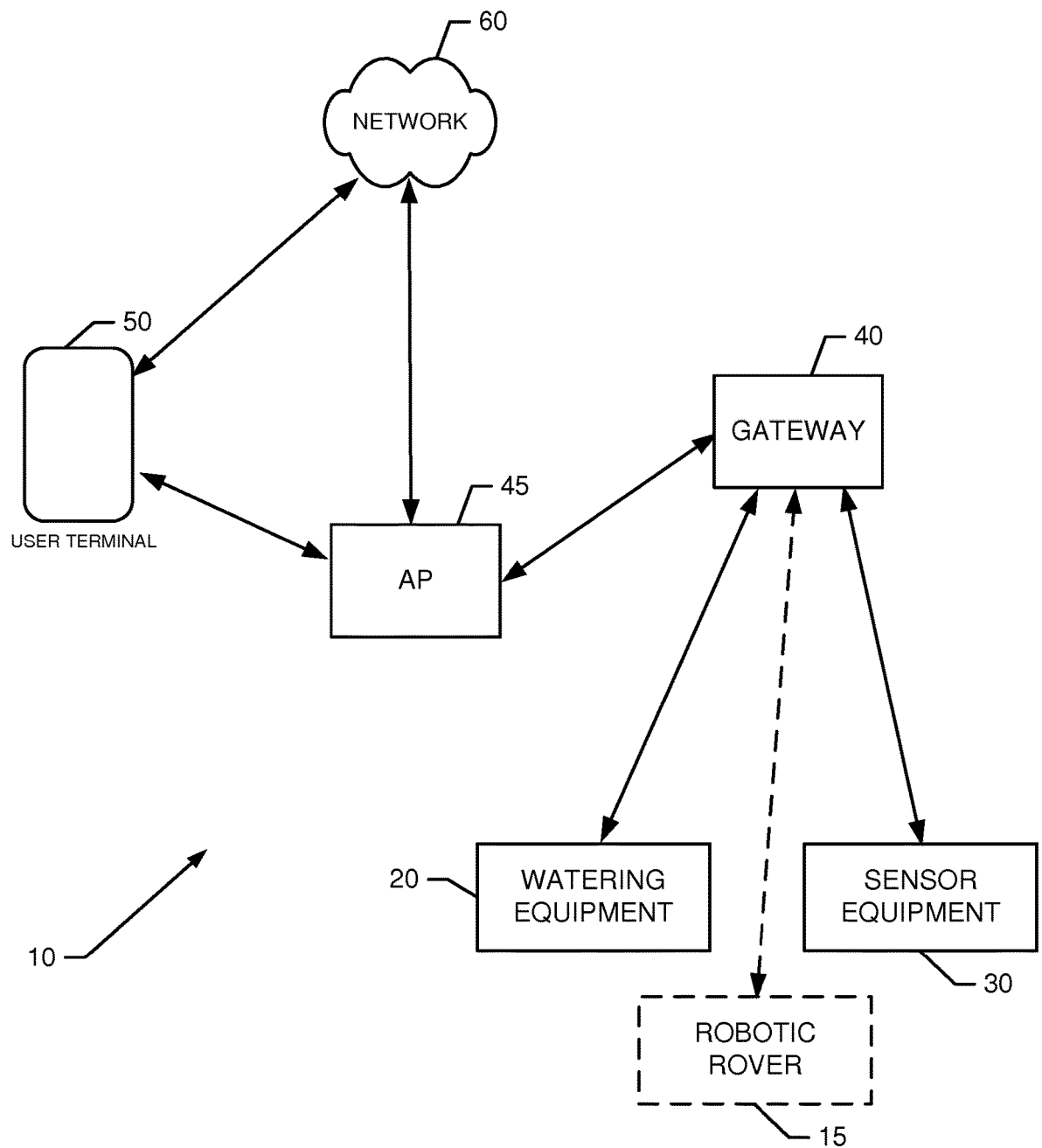
FIG. 1 illustrates a block diagram of a system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. Thus, yard maintenance should be appreciated to encompass gardening, lawn care, combinations thereof, and/or the like. As used herein, operable coupling should be understood to relate to direct or indirect connection that, in either case, enables functional interconnection of components that are operably coupled to each other.

Example embodiments may provide an intelligent system for monitoring and/or maintaining yard conditions (i.e., lawn and/or garden conditions) at any of what may potentially be a number of locations throughout a particular parcel, and allowing the operator to interface with devices within the system in a flexible way. Moreover, the devices of the system may be coordinated in their activities and/or may be configured to adapt to their environment or at least to the current conditions or stimuli that are present in their environment. In some cases, the operations conducted and/or monitoring may be accomplished with the assistance of a mobile asset such as a robotic rover. In this regard, for example, the system may utilize a communication network that gathers information on growing conditions from sensor equipment for association of the information with the areas from which the information was gathered. The system may also employ an interface mechanism that allows the operator to have a great deal of flexibility with remotely controlling various components of the system and programming such components via processing circuitry at each respective component. Programming may therefore be coordinated remotely, but at least some of the programming may also be stored locally so that the system can operate with or without connectivity. In some cases, the connectivity aspects of the system may utilize home network components and wide area network components (e.g., the internet), but may also include a gateway that is configured to interface between the deployed components (e.g., components in the yard/garden or otherwise related to yard maintenance) and the home network/wide area network components. As mentioned above, the processing aspects may be distributed between local and remote management components so that some aspects of yard maintenance may utilize remote assets or at least incorporate information available from abroad, while other aspects can be managed locally. In any case, adaptability and ease of interface and control are characteristics of the system that are improved by employing example embodiments.

The system may therefore employ any combination of fixed and/or mobile assets that gather data that relates to specific segments of the parcel that may correspond to respective different areas. In particular, the system may employ an intelligent watering pump that is configured to be programmed for servicing one or more such specific segments. The specific segments may have different types of plants therein, and therefore may optimally have different growing conditions desirable in connection with each respective one of the segments. The owner/operator may program operating instructions to guide the deployed components (including the intelligent watering pump) relative to operations in one or more of the specific segments, which may be referred to as "zones." In some cases, the processing circuitry may be equipped to allow the user to define specific operating parameters and the system may then adapt to the current conditions to operate according to the operating parameters. Given that internet connectivity is possible, in some cases, the system may be employed to correlate desirable growing conditions to an identified plant species based on stored information associated with each plant species from a database or online resource. Accordingly, each zone may have corresponding growing condition parameters associated therewith, and the user can see the growing condition parameters relative to the various areas and program operation of system components accordingly relative to maintaining desired growing conditions (e.g., any or all of moisture level, temperature, lighting level, pH, and/or the like) for the corresponding zone. In some cases, schedules among deployed components may be deconflicted or otherwise organized to prevent damage to components, ineffective use of resources, or efficiency reducing behaviors. The deployed components associated with the zones may provide the operator with reports and/or warnings via the gateway to enable the operator to intercede in certain situations, or the components may simply respond and inform the operator of their responses via the gateway.

FIG. 1 illustrates a block diagram of a system 10 that may be employed to accomplish the basic operations described above in accordance with an example embodiment. Within the context of FIG. 1, it should be appreciated that certain tasks, like grass cutting, chemical application, visual monitoring and/or the like may be performed by a robot or robotic rover 15. Because the system could operate without the robotic rover 15, the robotic rover 15 is shown in dashed lines in FIG. 1. Robots or other devices could also be engaged to perform certain other yard maintenance tasks such as raking, fertilizing, lighting, wildlife dispersion and/or the like.

Other tasks, like lawn watering, may be performed by sprinkler/irrigation heads and/or a watering pump that interfaces therewith. The sprinkler/irrigation heads may be attached to hoses and the watering pump may provide a mechanism by which to control the turning on/off of water application at the respective sprinkler/irrigation head locations by providing a central intelligently controllable source for providing water to the sprinkler/irrigation heads and/or the hoses. The hoses, sprinkler/irrigation heads, and/or watering pump may together form watering equipment 20.

Meanwhile, various sensors may be employed by insertion of such sensors into soil for monitoring soil or other growing conditions (e.g., lighting levels, moisture levels, pH, temperature, video or image data, etc.). These sensors may therefore be understood to take various forms within the system 10. However, generally speaking, the sensors may have connectivity to the system 10 in order to enhance operation of system components on the basis of the soil and/or growing condition information gathered by the sensors. Regardless of the specific configuration or placement paradigm, the various sensors may represent sensor equipment 30, as described above.

The sensor equipment 30, and in some cases also one or more of the devices that comprise the watering equipment 20, may be in communication with a gateway 40 via wired or wireless connections. The gateway 40 may subsequently have wired or wireless connection to an access point (AP) 45, which may be directly or indirectly connectable to a user terminal 50. The AP 45 may be a router of a home network of the operator. In some cases, direct connection of the AP 45 to the user terminal 50 may be provided via short range wireless communication methods (e.g., Bluetooth, WiFi and/or the like). Indirect connection of the AP 45 to the user terminal 50 may occur via a network 60. The network 60 may be a data network, such as a local area network (LAN), a metropolitan area network (MAN), a wide area network (WAN) (e.g., the internet), a wireless personal area network (WPAN), and/or the like, which may couple devices (e.g., the deployed components) to devices such as processing elements (e.g., personal computers, server computers or the like) and/or databases such as the user terminal 50. Communication between the network 60 and other devices of the system 10 may be accomplished by either wireline or wireless communication mechanisms and corresponding communication protocols. As such, for example, some or all of the sensors of the sensor equipment 30, the watering equipment 20 and/or the robotic rover 15, may be connected to the user terminal 50 by wire and/or be wireless communication means.

It should also be appreciated that although the robotic rover 15 is illustrated separately in FIG. 1, the robotic rover 15 may act as one or both of a piece of sensor equipment 30 or a piece of watering equipment 20. However, given the ability of the robotic rover 15 to act as either or both of a piece of sensor equipment 30 or a piece of watering equipment 20 and the ability of the robotic rover 15 to perform other tasks (e.g., grass cutting) in combination with or independent of the sensor equipment 30 and the watering equipment 20, the robotic rover 15 is shown separately in FIG. 1.

The gateway 40 may be a translation agent configured to interface with any or all of the deployed components via wired or wireless communication. In some embodiments, the gateway 40 may include a high performance antenna to enable the gateway 40 to communicate wirelessly with deployed components via an 868 mHz radio link (e.g., a first wireless link). However, other radio links may be employed in other cases. The first wireless link, and the components connected thereby, may be part of a first network (e.g., a garden network) or deployed component network that extends outdoors. Components internal to the house or business, and extending to and between the user terminal 50 may form a second network. As such, the gateway 40 may be a translation agent between the first and second networks. The gateway 40 may be an aggregation point and communications center for communications in both networks.

As such, the gateway 40 may be provided within the home or otherwise indoor environment of the operator, and still wirelessly communicate with the deployed components (via the first wireless link) to translate instructions thereto from the operator, which may be provided via a second wireless link to the AP 45. In an example embodiment, the wireless communications may be secured by employing encryption or other security techniques. The gateway 40 may also provide secure cloud data storage through connection to the network 60 (e.g., via the AP 45). In some examples, the first and second wireless links may be different wireless links that employ different communication protocols and/or frequencies.

The gateway 40 may also provide the ability for each of the deployed components to be monitored, controlled, programmed, or otherwise interfaced with by an operator using the user terminal 50. In particular, in some cases, the user terminal 50 may be configured to execute an application (or app) that is tailored to providing an easy setup and/or easy to use interface for interaction with the gateway 40 (and the corresponding deployed components that are reachable through the gateway 40). The user terminal 50 may therefore be a smartphone or other mobile terminal, or a laptop, PC, or other computing/communication device. As such, the user terminal 50 may include processing circuitry that is enabled to interface with corresponding processing circuitry of the gateway 40 and/or the deployed components to program, control or otherwise interact with the deployed components in a manner described in greater detail below.

The interaction between the user terminal 50 and the gateway 40 to facilitate programming of, control of, or interaction with the deployed components may create an interactive and fully connectable garden system for irrigation or mowing control/coordination. The app that may be executed at the user terminal 50 may be configured for control of any or all of the deployed components on a real time or programmed basis. The resulting system may be a holistic and connected automatic garden system. Moreover, the connection to content on the internet via network 60 may allow educational content to be integrated into the system's operation to provide operators with an improved interface and more control over gaining full satisfaction of their gardening experience. For example, the educational content may include videos that example how to start, program, or troubleshoot any operations regarding the components of the water equipment 20. In an example embodiment, the app may be used to program at least some of the watering equipment 20 to operate on a locally stored watering schedule in a first mode and operate as an autonomous pressure pump in a second mode of operation.

Figure 2:
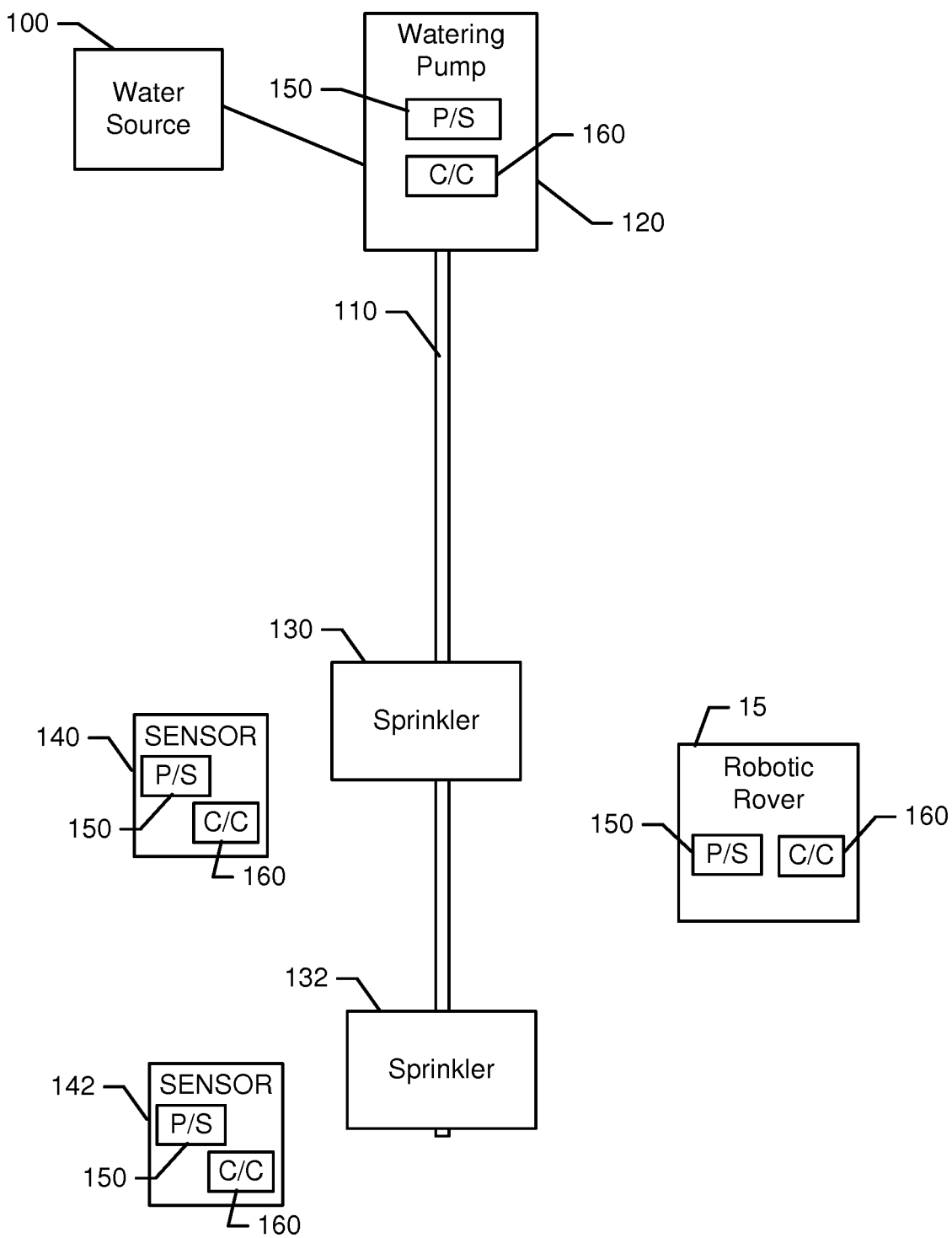
FIG. 2 illustrates a block diagram of deployed components of the system according to an example embodiment.

FIG. 2 illustrates a water migration path that may be practiced in connection with an example embodiment. However, it should be appreciated that some of the components may be removed in simpler example embodiments, and some components may be added to provide more complex architectures in other example embodiments. Thus, the example of FIG. 2 is not provided to be limiting in relation to the components included in the system, but merely to show an example of some components that may be included in one example system. Moreover, it should be appreciated that although FIG. 2 shows a single water delivery line, other embodiments can employ multiple water delivery lines to service a parcel or yard. Thus, example embodiments may be practiced with any number of lines, and with separate and/or different water sources.

Referring now to FIG. 2, a water source 100 may be used to charge a water line 110 via a watering pump 120. In some cases, the water source 100 may also charge a second water line via a second watering pump, or via the first watering pump 120. The water line 110 may be a flexible water hose or garden hose. The watering pump 120 may be one of the deployed components that forms one component of the watering equipment 20 of FIG. 1. The watering pump 120 may be operably coupled to the water source 100 such that the water source 100 is a pressurized water supply for the water line 110 when the watering pump 120 is operational. However, when the watering pump 120 is not operational, the water line 110 may be substantially depressurized, or at least only have residual pressure remaining from the last operation of the watering pump 120. Thus, it should be understood that the water source 100 is not a typical pressurized water supply of a house or other structure. Instead, the water source 100 may typically be an otherwise unpressurized water source, such as a reservoir or cistern.

In an example embodiment, one or more sprinklers (e.g., a first sprinkler 130 and a second sprinkler 132) may receive water from the water line 110. The water line 110 may be selectively charged under control of the watering pump 120 to provide water for spraying from the first and second sprinklers 130 and 132. Likewise, if used, the second water line may be selectively charged under control of the watering pump 120, or a second watering pump, to provide water for spraying from any additional sprinklers associated with the second water line. When the water line 110 is charged, the first and second sprinklers 130 may be provided with pressurized water that is distributed therethough responsive to operation of the watering pump 120. The first and second sprinklers 130 and 132 may typically be components that are not provided with any local intelligence. Instead, the first and second sprinklers 130 and 132 may only be controllable via operation of the watering pump 120 to turn on and off watering functions. However, it is possible that the first and second sprinklers 130 and 132 could have intelligent components and/or control aspects provided therein in some cases.

One or more sensors (e.g., first sensor 140 and second sensor 142) may also be provided at various locations in the parcel that is served by the sprinklers to detect or sense conditions proximate to the corresponding sensors. The first and second sensors 140 and 142 may each correspond to a respective one of the first and second sprinklers 130 and 132, and the app at the user terminal 50 may be configured to note such correspondence so that information received from a respective one of the first or second sensor 140 or 142 can be correlated to actions that may be ordered to the watering pump 120, if needed, based on the information.

In some examples, some of the deployed components may include a power supply (P/S) 150 that is local to the corresponding ones of the deployed components. The P/S 150 of each component may be a battery or battery pack, or mains power. Each powered one of the deployed components may also include communication circuitry (C/C) 160 that includes processing circuitry for controlling each respective component and an antenna for enabling the deployed components to communicate with the gateway 40 via the first wireless link (or alternatively via a wired connection). The robotic rover 15 (if employed) may also be an example of the deployed components, and thus the robotic rover 15 may also include the P/S 150 and the C/C 160. However, it should be appreciated that the various power supply and communication circuitry components may have different scale, structure and configuration features.

The watering pump 120 may generally operate under the control of the C/C 160 to respectively isolate and operably couple the water source 100 from/to the water line 110. The watering pump 120 may operate based on operational and volume mode instructions received through the gateway 40 or based on operational and volume information stored or otherwise accessible via the C/C 160 of the watering pump 120. The watering pump 120 may provide convenience to operation of the system 10 since the watering pump 120 can be controlled from anywhere and/or at anytime via the app at the user terminal 50, or via locally stored programming instructions, by selecting or executing the desired/programmed operational and volume mode, as described in greater detail below.

Figure 3:
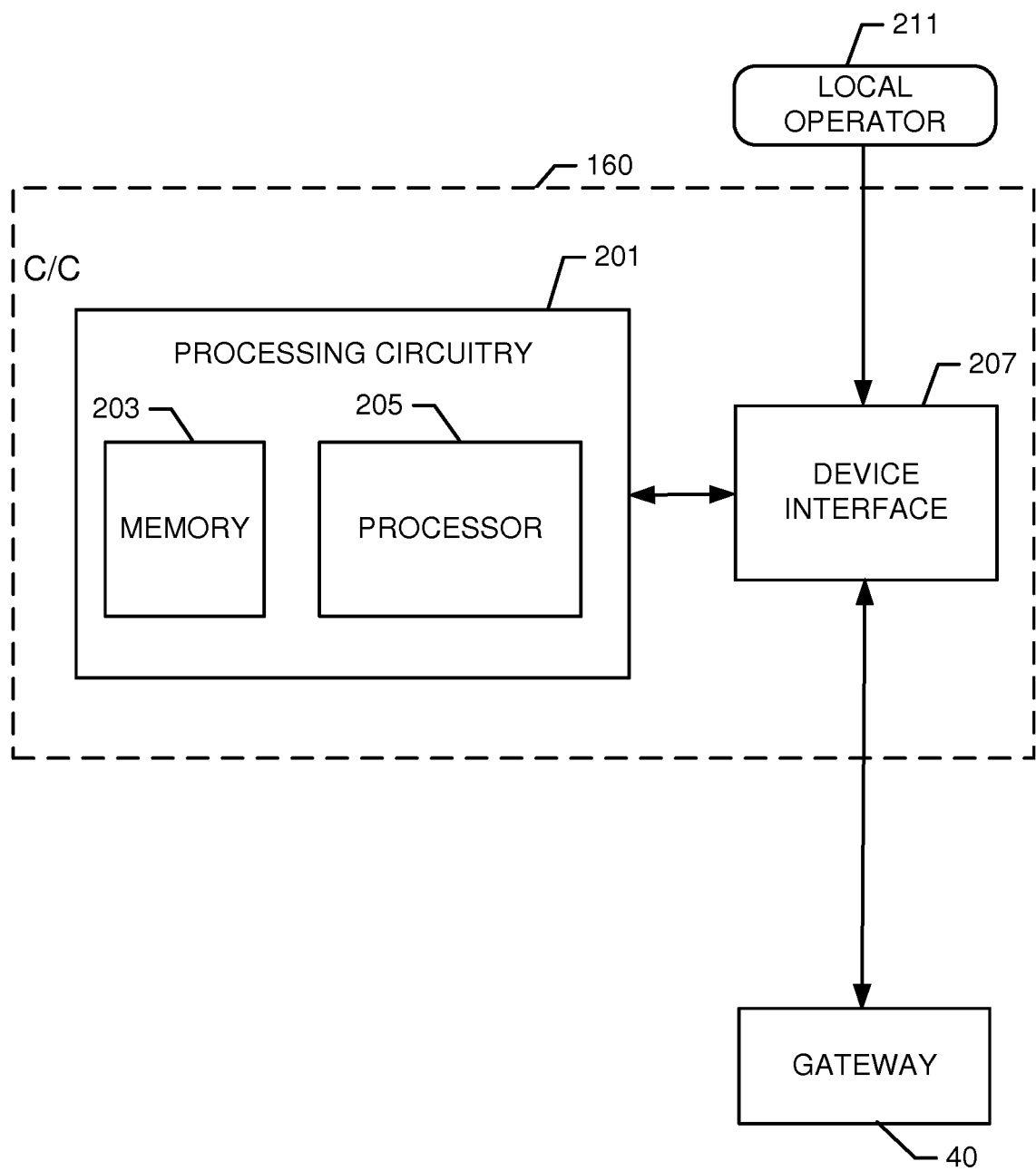
FIG. 3 illustrates a block diagram of processing circuitry that may be employed in the deployed components according to an example embodiment.

In an example embodiment, the C/C 160 may include processing circuitry 201, as shown in FIG. 3. The processing circuitry 201 that may be configured to perform data processing, control function execution, and/or other processing and management services according to an example embodiment of the present invention. In some embodiments, the processing circuitry 201 may be embodied as a chip or chip set. In other words, the processing circuitry 201 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 201 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 201 may include one or more instances of a processor 205 and memory 203 that may be in communication with or otherwise control a device interface 207. As such, the processing circuitry 201 may be embodied as a circuit chip (e.g., an integrated circuit chip) configured (e.g., with hardware, software or a combination of hardware and software) to perform operations described herein. In some embodiments, the processing circuitry 201 may communicate with internal electronic components of the watering pump 120, the first or second sensors 140 and 142 and/or the robotic rover 15, and enable communication externally with other components.

The device interface 207 may include one or more interface mechanisms for enabling communication with other devices via the gateway 40. In some cases, the device interface 207 may be any means such as a device or circuitry embodied in either hardware, or a combination of hardware and software that is configured to receive and/or transmit data from/to the gateway 40 by virtue of the device interface 207 being capable of sending and receiving messages via the gateway 40. In some example embodiments, the device interface 207 may provide interfaces for communication of components of or external to the system 10 via the gateway 40. If the C/C 160 is for a sensor, the device interface 207 may further interface with a sensor (e.g., a temperature sensor, a pH sensor, a light sensor, a moisture sensor and/or the like) to obtain sensor data for communication to other devices (e.g., the watering pump(s)). Meanwhile, if the C/C 160 is for a watering pump, the device interface 207 may provide interfaces to other onboard components (e.g., a user interface including lights and a main button as described below).

The processor 205 may be embodied in a number of different ways. For example, the processor 205 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 205 may be configured to execute instructions stored in the memory 203 or otherwise accessible to the processor 205. As such, whether configured by hardware or by a combination of hardware and software, the processor 205 may represent an entity (e.g., physically embodied in circuitry—in the form of processing circuitry 201) capable of performing operations according to embodiments of the present invention while configured accordingly. Thus, for example, when the processor 205 is embodied as an ASIC, FPGA or the like, the processor 205 may be specifically configured hardware for conducting the operations described herein. Alternatively, as another example, when the processor 205 is embodied as an executor of software instructions, the instructions may specifically configure the processor 205 to perform the operations described herein.

In an example embodiment, the processor 205 (or the processing circuitry 201) may be embodied as, include or otherwise control the C/C 160. As such, in some embodiments, the processor 205 (or the processing circuitry 201) may be said to cause each of the operations described in connection with the C/C 160 (and corresponding distributed component with which the C/C 160 is associated) by directing the C/C 160 to undertake the corresponding functionalities responsive to execution of instructions or algorithms configuring the processor 205 (or processing circuitry 201) accordingly. As an example, the C/C 160 of the sensors may be configured to detect environmental parameters (e.g., sensor data) and report the sensor data via the first wireless link to the gateway 40 (and ultimately to the app on the user terminal 50 or to storage in the cloud via the network 60) or to the watering pump 120. In some cases, the C/C 160 of the sensors may be configured to determine a difference between a prior set of sensor data (e.g., the magnitude of a previous sensor measurement) and the current set of sensor data (e.g., the magnitude of a most recent sensor measurement). The amount of difference may then be used to determine whether or not the sensor will report the current set of sensor data. If the difference is small (e.g., less than a threshold amount) the sensor may not report the new value. However, if the difference is large enough (e.g., larger than the threshold amount), then the sensor may report the new value. As such, the C/C 160 of the sensors may be configured to perform battery conservation techniques relative to reporting of sensor data. The C/C 160 of the sensors may also be configured to otherwise report (or make a determination on whether to report based on the criteria discussed above) sensor data on a given schedule or responsive to certain activities or events. When a trigger event (e.g., temporal or action based trigger) occurs, the C/C 160 of the sensor may make a determination of the current sensor data and decide whether or not to report the sensor data.

The C/C 160 of the watering pump 120 may be configured to receive instructions from the gateway 30 regarding an operational mode of the watering pump 120 as defined by the app, or by locally stored programming. For example, the gateway 40 may receive instructions from the user via the user terminal 50 regarding what operational mode (e.g., controlling on/off cycles of the pump) the user desires the watering pump 120 to operate in. In some example embodiments, the user-selectable operational modes of the watering pump 120 may include, but are not limited to, an intelligent mode, a scheduled mode, or a manual mode. When the intelligent mode is selected by the user, the watering pump 120 may operate independently based on programmed triggers. In some cases, the triggers may be sensor data received from the first or second sensor 140 or 142. For example, the C/C 160 of the watering pump 120 may be programmed to turn on the watering pump 120 and provide water when sensor data falling within or exceeding certain ranges or thresholds is received. Thus, in some example embodiments, if the sensor data indicates that soil moisture is below a given threshold, the watering pump 120 may be configured to energize the watering pump 120 to enable delivery of water to the sprinklers.

When the scheduled mode is selected by the user, the operator may select a schedule on which the watering pump 120 may operate. For example, the user may select certain times or days in which the watering pump 120 should operate. If the manual mode is selected by the user, the watering pump 120 may only operate upon the user selecting an option on the user terminal 50 that directs the operation of the watering pump 120. Therefore, the user at any time may decide to water the lawn and may direct the watering pump 120, via the user terminal 50, to operate. In some cases, the user may select more than one operational mode at a time. For example, the user may send instructions, via the gateway 40, to the watering pump 120 regarding a schedule on which the watering pump 120 is to operate. However, in addition to this provided schedule, the user may instruct the watering pump 120 to also simultaneously act in the intelligent mode. For example, the user may define triggers under which the watering pump 120 may operate. These triggers may include, but are not limited to, the soil moisture falling below or exceeding a given threshold. Accordingly, the watering pump 120, via the C/C 160, may be configured to operate on a schedule while also operating in response to pre-defined triggers. Even if the user has selected that the watering pump 120 is to operate under both the intelligent and scheduled mode, the user may select the manual operation mode which causes the watering pump 120 to operate whenever the user desires. The user may select this manual operation mode without affecting the already programmed intelligent and scheduled modes.

Even further, the C/C 160 of the watering pump 120 may be configured to receive instructions from the user (via the gateway 40) regarding a volume mode of the watering pump 120. Therefore, the gateway 40 may receive instructions from the user via the user terminal 50 regarding not only what operational mode (e.g., on/off cycle control) the user desires the watering pump 120 to operate in, but what volume mode the watering pump 120 should operate in where the volume mode defines pump speed or output pressure. The volume modes of the watering pump 120 that may be selectable by the user include, but are not limited to, 1) micro drip mode; 2) small amount mode; 3) conservation mode; 4) automatic mode; or 5) garden mode. The micro drip mode, for example, may supply a small amount of water at a gentle drip or trickle pressure. The user may select the micro drip mode for irrigating or watering flowers or vegetation. The small amount mode may be suitable for when only a small area is being irrigating or watered. The conservation mode may ensure that the watering pump 120 is not operational while a shower, washing machine, dish washer, or the like is being operated in the house associated with the parcel to ensure sufficient water pressure is maintained both in the home and at the watering pump 120. The automatic mode may allow the C/C 160 of the watering pump 120 to determine the appropriate volume of water to be supplied by the watering pump 120 based on the on sensor data received from the first or second sensor 140 or 142. The garden mode may be selected when a full soaking of the garden, lawn, or flower bed is desired and full pump or line pressure is desired.

In some cases, the volume modes may be selectable based on certain areas of the lawn or parcel. Even further, some of the volume modes may be selectable simultaneously. For example, the user, via the user terminal 50, may select that the garden mode should be employed on Saturday at 8:00 a.m. for zone 1 of the parcel. In conjunction with selecting the garden mode for the applicable time period for zone 1, the user may also select the conservation mode. Therefore, if the washing machine is running at 8:00 a.m. on Saturday morning, the C/C 160 may be configured to delay the operation of the watering pump 120 in garden mode until there is detection that the washing machine has shut-off or until a preset time delay expires. In other cases, the user may be alerted, via the user terminal 50, that the garden mode was not implemented due the detection of the washing machine being operated. Upon receiving this alert, the user may override the conservation mode and implement the garden mode, or in some cases, the user may select when the garden mode should be rescheduled.

In some example embodiments, the last received instructions regarding the operational or volume mode from the user may be stored locally in the memory 203 of the C/C 160. Accordingly, if the C/C 160 loses connectivity to the gateway 40, the C/C 160 may continue to employ the last received instructions regarding the operational or volume mode of the watering pump 120. In another example embodiment, if the C/C 160 loses connectivity to the gateway 40 or loses connectivity for longer than a predetermined time period, the C/C 160 may be configured to override the last received instructions from the user regarding the selected operational or volume mode and switch to a default setting. In some cases, the default setting may the intelligent operational mode or the automatic volume mode. Therefore, the C/C 160 will determine the appropriate time to water and the appropriate volume of water to be supplied by the watering pump 120 based on sensor data received from the first or second sensor 140 or 142. In either case, the default settings or the last received instructions (and any programs associated therewith) are stored locally at the C/C 160 so that the watering pump 120 can operate independently of connectivity to the network 60.

The C/C 160 of the robotic rover 15 may be configured to control the travels and operations of the robotic rover 15. Moreover, the C/C 160 of the robotic rover 15 may allow the gateway 40 to grant user access to modification of the schedule of operations of the robotic rover 15 and/or to take real-time control over various operations of the robotic rover 15. In an example embodiment, the app at the user terminal 50 may be employed to coordinate and/or de-conflict programmed water schedules and mowing schedules. Additionally or alternatively, if the operator makes a modification to a operational mode of the watering pump 120 or takes manual control of one or more components, the app at the user terminal 50 may provide alerts to indicate that the proposed changes to the schedule or current operational mode may be problematic, or may prevent the making of such changes. Thus, for example, if the robotic rover 15 is mowing in an area in which a sensor indicates a low soil moisture value that would normally trigger operation of the watering pump 120 via the programming of the watering pump 120, an alert may be provided to indicate that the robotic rover 15 should have its operations changed, or the opening of the watering pump 120 may be delayed.

In an example embodiment, the electronic deployed components (e.g., components having a P/S 150) may further include a local operator 211 (e.g., a button, knob or other control device) provided at a portion thereof. In some cases, the local operator 211 may be provided to allow local manual setting of one or more characteristics of the watering pump 120. Thus, for example, the local operator 211 may be used to determine pump output pressure, speed, volume mode, operational mode, and/or the like. The local operator 211 may trigger different functionalities through the programming of the processing circuitry 201 for corresponding different situations and/or actuation methods. For example, some actuation of the local operator 211 may cause the corresponding device to go into a pairing mode. Once in the pairing mode, the device may be detectable by the gateway 40 and/or other devices for a given period of time. The app on the user terminal 50 may be used to detect the device in pairing mode and, once detected, the app may also be used to pair the device to another device (e.g., of the first network—the deployed component network). The gateway 40 and the C/C 160 of the corresponding devices may then be capable of communication with each other on a continuous, event driven, or scheduled basis via the first wireless link. Thus, for example, the first sensor 140 may be configured to provide sensor data to the watering pump 120 (e.g., via the gateway 40). In some cases, the first sensor 140 may be paired with the watering pump 120 via a setup procedure and communicate thereafter on a schedule or an activity/event driven basis. In some cases, simple replacement or insertion of a battery to power up the device may be an additional or alternative method by which to initiate the pairing mode.

In some cases, certain defined actuation (or patterns of actuation) of the local operator 211 may result in returning the device to factory settings. As such, contents of the memory 203 may be cleared or otherwise reset to initial settings or conditions. Other functions may also or alternatively be provided. Moreover, some devices may have additional buttons or operable members.

Communication between the gateway 40 and the sensors or watering pumps may occur for pairing purposes and to facilitate the operational activities for which the system 10 is ultimately configured. Thus, for example, the operator may use the app at the user terminal 50 to connect to the gateway 40 and may be provided with one or more control console or interface screens that provide options for interacting with deployed components and/or for programming the deployed components, as described above. In some cases, initial setup of the system may be facilitated by placing individual deployed components (either sequentially or simultaneously) in a pairing mode. The deployed components are then discoverable via the first wireless link and can be added to the first network. Once added to the first network, the deployed components are considered to be assets of the first network that can be interacted with/programmed and/or the like. The deployed components can then be paired with each other and configured for individual and/or cooperative functional performance.

In an example embodiment the watering pump 120 may be paired with other second watering pumps, with the robotic rover 15 and/or the first sensor 140. When the watering pump 120 is paired with and connected to the first sensor 140, the operator may have options provided (e.g., via the app) to select the desired operational or volume mode of the watering pump 120. In cases where the intelligent operational mode is selected by the user, the watering pump 120 may therefore be instructed regarding the specific stimuli that may be received from the first sensor 140 to trigger operation of the watering pump 120. However, as described above, the watering pump 120 may be provided with (e.g., in the memory 203) a schedule or a trigger which causes the watering pump 120 to "ping" or otherwise reach out to the first sensor 140 to initiate communication to receive sensor data. Based on the sensor data received (e.g., if certain threshold parameters are reached or not), the watering pump 120 may be opened or closed.

When the watering pump 120 is paired with and connected to the robotic rover 15, automatic coordination of schedules may be accomplished at least relative to ensuring that mowing and watering are not conducted in the same area at the same time. The app on the user terminal 50 may ensure that scheduling of mowing during watering (or vice versa) is not possible. However, given that the operator can take control of the watering pumps and/or the robotic rover 15 to initiate operations, the app on the user terminal 50 may further prevent any attempts to initiate operations of watering pumps or the robotic rover 15 in real-time when the other is also operating in the same area.

When the watering pump 120 is paired with and connected to other watering pumps, watering schedules or operations can be coordinated to manage or prevent underpressure situations or excessive draining of the water source 100. For example, if the watering pumps are connected to the same water source, it may be possible for water supply to be insufficient to effectively charge both the water line 110 and the second water line at the same time. Thus, by allowing multiple watering pumps to be in communication with each other, operations of one may be communicated to the other (e.g., via the gateway 40) so that the water source 100 and its supply of water can be managed effectively.

Therefore, the deployed components of various example embodiments may be adaptive to various conditions or situations. Moreover, the adaptive nature of the deployed components may be provided, as described above, as a programmable feature, where the operator can use the user terminal 50 to program modes, adjustable parameters, relationships, or responses. In the context of some examples, the programmable features should be understood to be remotely programmable (i.e., programmable from the app and/or the user terminal 50 remote from the component being programmed) via the gateway 40. In other examples, the adaptive nature of the deployed components may be provided as a default feature. Thus, the adaptive capabilities of the deployed components may either be dependent upon connectivity (e.g., connectivity dependent) for remote programming, or may be connectivity independent (e.g., default programming that exists or is instituted when there is no connectivity or responsive to a loss of connectivity.

In some embodiments, battery power levels may be communicated to the gateway 40 and signal strength values relating to communication with the sensors and/or watering pumps may also be determined at the gateway 40. This information (along with sensor data) may be provided to the app at the user terminal 50 to alert the operator when battery power is low, or signal strengths are low. Battery replacement and/or sensor repositioning may then be undertaken to improve the situation. As mentioned above, in some cases, the sensor may also adaptively respond to its surroundings to trigger reports. In an example embodiment, the watering pump 120 may attempt to ping the first sensor 140 via the gateway 40 to trigger a report of sensor data. However, the first sensor 140 may be configured (e.g., via the C/C 160) to determine the amount of change in the requested parameter before deciding whether to respond to the ping. In some embodiments, a change of at least a specific amount or percentage (e.g., 5%) may be required before the first sensor 140 will report sensor data via wireless transmission. Since wireless transmission consumes more power than internal operation (e.g., to determine the amount of change and current sensor data), by saving several transmission cycles when there is little data change, battery life can be substantially extended. When a ping is sent and no response is received, the last value received may be substituted and communicated to the operator (e.g., via the app).

The operator can turn on/off or wake up the watering pumps and/or sensors by sending instructions via the user terminal 50 through the gateway 40. For example, the wake up message may be used to see if the devices are still reacting and active, or to request specific data from or initiate actions at such components in real time. Moreover, in some cases, the operator can send a wakeup, or setup signal to have the corresponding device beacon for at least a predetermined amount of time (e.g., three minutes). During this time, the devices may be positioned and the operator may check the app to see what signal strength is detected by the gateway 40. The operator can therefore position the devices in real time and make sure that the position in which a device is currently located is a good location from the perspective of its ability to communicate with the gateway 40.

In some embodiments, one or more of the deployed components may further include frost warning capability. In particular, since the watering pumps typically may have some residual water therein, it should be appreciated that freezing of water in the body of the watering pumps may be destructive to the watering pumps. Accordingly, the C/C 160 of one or more components (especially the watering pumps) may be configured to identify situations where there is a potential for frost that may damage the watering pumps or other watering equipment 20. In some embodiments, if the temperature reaches a predetermined threshold distance from the freezing point (e.g., 5 degrees C., or 10 degrees F.), an alert may be issued (e.g., through the app at the user terminal 50) to warn the operator that the watering pump 120 (and/or sensors) should be brought in to avoid damage. The predetermined threshold may be a factory setting, or may be set by the operator. However, in either case, the ability to identify a present temperature condition to alert the operator of a possible frost event is another example of how the deployed components may be configured (by operator program or by default) to be adaptive relative to their surroundings and/or circumstances.

Another example of the adaptability of the deployed components relates to the inability to connect to the first network or a loss of connection to the first network. For example, although the last received operation or volume mode could be maintained in the cloud, on the user terminal 50, or elsewhere, in some cases, the current operational or volume mode (or at least a portion thereof) may be stored locally at the watering pumps. For example, the memory 203 may be configured to record at least the last water schedule information employed. Thus, if power is lost at the gateway 40 or at another system component that thereby renders connectivity impossible, the watering pump 120 may store at least the information indicative of its last watering schedule. Thus, for example, if the watering pump 120 operated at 1300 and shut down at 1305, if no connection to the network 60 for determining the watering schedule can be achieved, or if connectivity is lost, the watering pump 120 will continue to water on the previously provided operational and volume mode. In some cases, if the C/C 160 of the watering pump 120 determines that connectivity has been lost for longer than a pre-determined time interval, the C/C 160 may be configured to override the previously provided operational and volume mode to operate on the default setting, as described above.

In further example embodiments, C/C 160 of the deployed components may able to determine the usage and runtime of each of the deployed components. For example, the C/C 160 may be configured to monitor and calculate the runtime of and the water usage by the watering pump 120. Therefore, the C/C 160 may be able to determine the volume of water used over a specific time interval, such as an hour, day, week, month, or plurality of months (i.e., seasons). These calculations may be provided to the user via the user terminal 50. Based on the calculations, the C/C 160 may determine an average runtime and usage of the watering pump 120 over a pre-determined time interval. Using these calculated average runtime and usage values, the C/C 160 may be configured to monitor any further usage and runtime of the watering pump 120. If the runtime or usage exceeds the average runtime and usage values, the C/C 160 may be configured to send an alert, via the gateway 40, to the user terminal 50 to indicate the status detection of the abnormal condition.

An even further example of the adaptability of the deployed components relates to the ability of the C/C of the deployed components to determine the recommended maintenance interval for the deployed components. For example, using the above calculated average runtime and usage of the watering pump 120 over a predetermined time period, the C/C 160 of the watering pump 120 may be able to calculate the recommended maintenance interval of the watering pump 120. This recommended maintenance interval may be displayed on the user terminal 50. In some example embodiments, the user may be able to override this recommended maintenance interval. The user may be able to select how he or she wants to calculate the maintenance interval (i.e., after a certain time period or certain calculated usage amount). In that case, the C/C 160 may be configured to alert the user when the time period has passed or when the specified usage amount occurs. Even further, the user may be able to input when the last maintenance was performed on the watering pump 120. By inputting the last maintenance performed, the C/C 160 may be configured reset the maintenance interval and recalculate in accordance with the above.

In some example embodiments, the C/C 160 of the deployed components may be even further configured to send messages to the user that operation of the deployed component has started. In other cases, the C/C 160 may be configured to send messages if the deployed component fails during operation or if an error occurs during operation. If a failure or error occurs during the operation of the deployed component, the user terminal 50 may have an option to for the user to send feedback to the manufacturer or supplier of the error or failure. In even further example embodiments, the user terminal 50 may be configured to allow the manufacturer or supplier to have remote access of the deployable component in response to receiving a request from a user or in response to receiving feedback regarding the failure or error of the deployable component.

The watering pump 120 described above could take different physical forms. However, an example structure for embodying a watering pump 120 may be a reciprocating or rotary pump. Thus, for example, the watering pump 120 may include a centrifugal pump having an impeller. However, other pump structures can also be employed.

Figure 4:
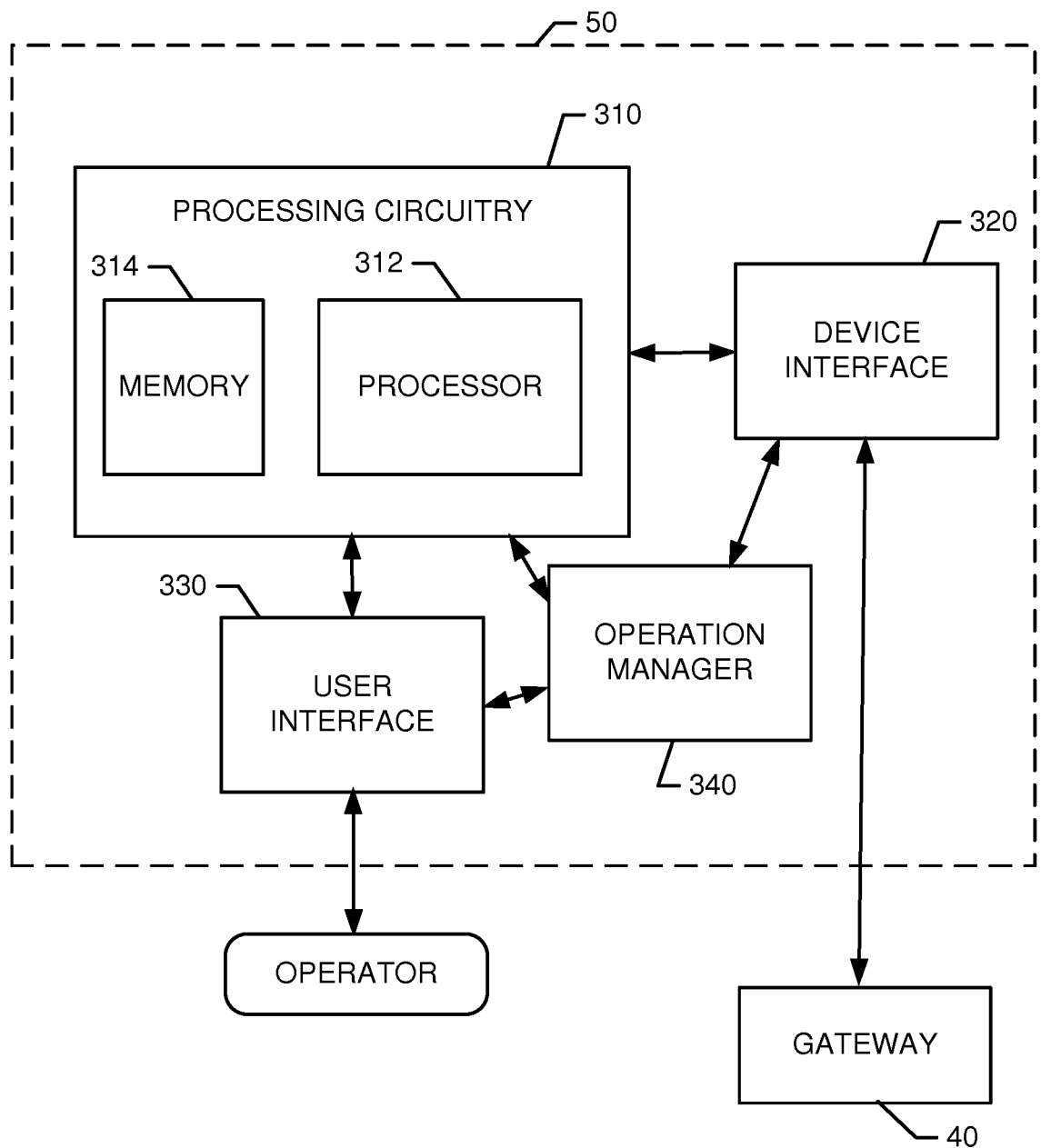
FIG. 4 illustrates a block diagram of processing circuitry that may be employed in a user terminal according to an example embodiment.

As has been noted above, the deployed components (e.g. the watering pump 120) may be largely controlled by the user via the user terminal 50. As mentioned above, the user terminal 50 could be a mobile device (e.g., a smartphone) or a fixed terminal (e.g., a PC). However, the user terminal 50 could also be other devices such as a tablet, laptop and/or the like. In any case, the user terminal 50 may be configured to provide a simple and intuitive interface for enabling the operator to control operation of the system 10. FIG. 4 illustrates a block diagram of some components of the user terminal 50 that may configure the user terminal to provide the app for control of the system 10.

As shown in FIG. 4, the user terminal 50 may include processing circuitry 310, a processor 312, memory 314 and device interface 320 that may be similar in form and/or function to the processing circuitry 201, processor 205, memory 203 and device interface 207 described above. Specific structures, forms and scales of such components may differ. However, the general capabilities may be similar so these components will not be described in detail again in detail. Instead, it should be appreciated that except for changes in specific configuration, content and structure, these components are generally similar. As shown in FIG. 4, the user terminal 50 may further include a user interface 330 and an operation manager 340.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display (e.g., a touch screen display), one or more buttons or keys (e.g., function buttons or a keyboard), and/or other input/output mechanisms (e.g., microphone, mouse, speakers, cursor, joystick, lights and/or the like). The user interface 330 may be configured to provide alerts, warnings and/or notifications to the user or operator responsive to various trigger conditions being detected (e.g., via the sensor equipment 30 or other components). System malfunctions, damage or tampering with equipment, equipment theft and other component related stimuli may also be defined as triggers for generation of the alerts, warnings and/or notifications. In some cases, the user interface 330 may be configured to generate such alerts, warnings and/or notifications in response to the runtime or usage of the watering pump 120 being out of the recommended ranges, or in response to system components having schedule or operational conflicts. Notifications may also be provided regarding general status, current conditions and/or the like. The alerts, warnings and/or notifications may be generated via light, sound, visual display, or other devices that may be connected to or part of the operation manager 340. In some cases, the notifications may be provided by text message or email. Even further, the user interface 330 may be configured to enable the user to delegate operation of the system to second user for a predetermined period of time. For example, if the user is going on vacation or will be out of town, the second user may be given permission to control the system via the second user's user interface.

In an example embodiment, the processing circuitry 310 may be configured to perform data processing, control function execution and/or other processing and management services according to an example embodiment of the present invention. As such, it may be appreciated that the processing circuitry 310 may be configured to control or be embodied as the operation manager 340. The operation manager 340 may be configured to receive sensor information from the sensor equipment 30 and/or the watering equipment 20 and make decisions regarding information to be provided to the owner/operator and/or instructions to be provided to the sensor equipment 30 and/or the watering equipment 20. The processing circuitry 310 may, in some cases, process the condition information received from the sensor equipment 30 and compare the condition information to growing condition parameters that are stored in the memory 314 for a given zone.

In an exemplary embodiment, the memory 314 may be configured to store information, data, applications, instructions or the like for enabling the operation manager 340 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input from the sensor network. Among the contents of the memory 314, applications may be stored for execution by the processor 312 in order to carry out the functionality associated with each respective application. In some cases, the applications may include applications for generation of control consoles for providing options for control of the system. In some cases, the applications may also or alternatively include applications for receiving information regarding component activity/status, environmental parameters, operational or volume mode, device pairing, and/or the like to allow the operation manager 340 to define responses to the information (e.g., based on predefined programming or user input). The information/parameters may be entered by the operator, received from deployed components, or may be extracted or retrieved from databases or sources accessible via the internet based on entry of an identity of the plant vegetation in a given zone.

Figure 5:
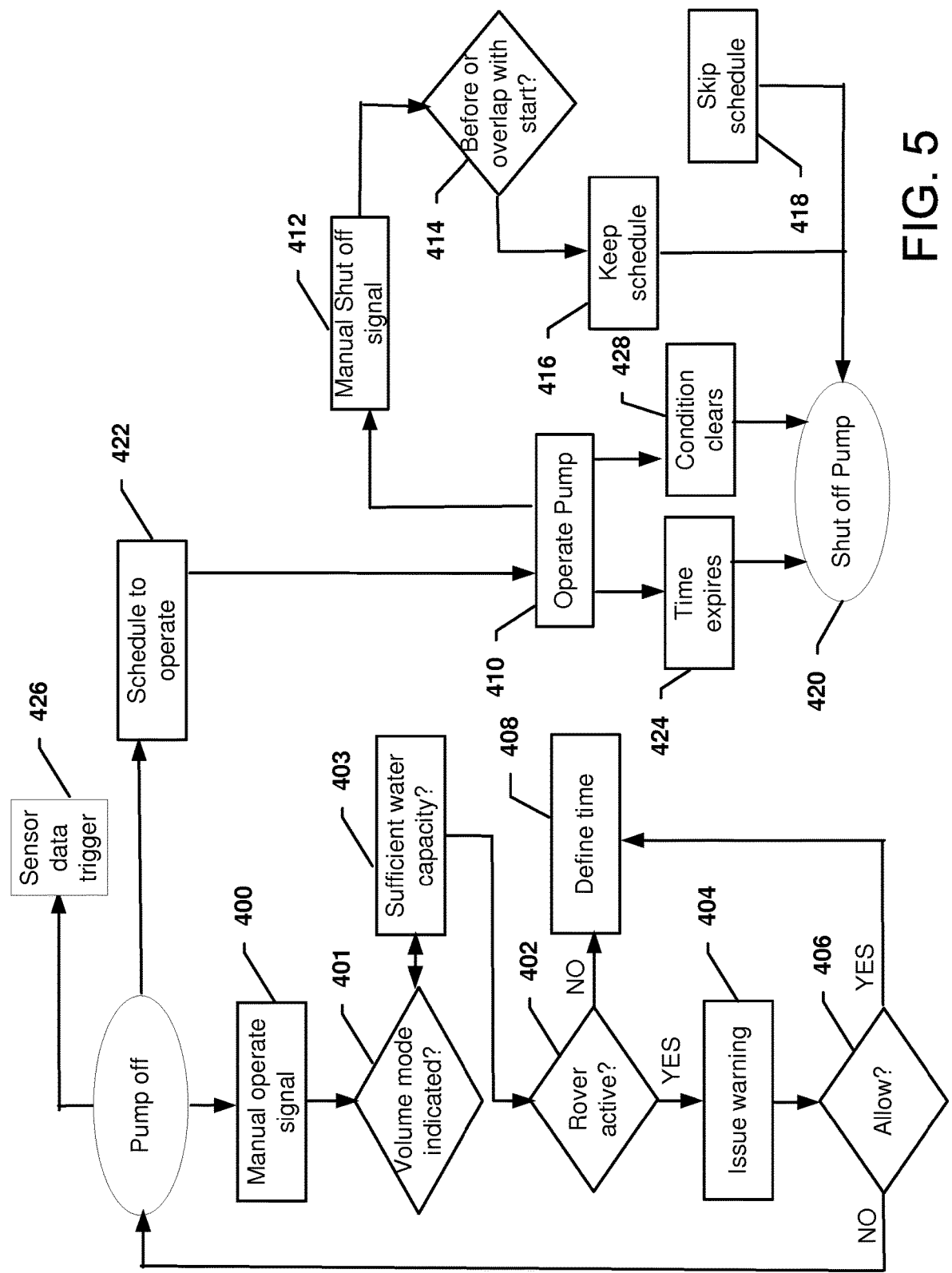
FIG. 5 illustrates a flow diagram of various operations associated with control of a watering pump in accordance with an example embodiment.

The operation manager 340 may therefore, for example, provide interface mechanisms for control of the operation of the watering pumps. FIG. 5 illustrates a block diagram of one example of operations that may be facilitated by the operation manager 340 in accordance with an example embodiment. As shown in FIG. 5, the watering pump may initially be off, but the user terminal 50 may present a control console (or series of control consoles) via which the operator can provide instructions to initiate the operations of FIG. 5. An instruction may be provided at operation 400 to turn on the watering pump 120 (i.e., via selecting manual mode). In response, a signal regarding the volume mode may be received at operation 401. Once, the pump on and volume mode signal is received, a determination may then be made at operation 402 as to whether the robotic rover 15 is active in the area (or at all). If the robotic rover 15 is active, a warning may be issued at the user interface 330 of the user terminal 50 at operation 404. The operator may then determine whether to allow operation of the watering pump 120 or not at operation 406. If the operator decides not to operate the watering pump 120, flow returns to the initial state. If the operator decides to allow operation of the watering pump 120 anyway (e.g., overriding or disregarding the warning), the operator may then be asked to enter a time duration for operation of the watering pump 120 at operation 408. Of note, the operator may also have the option to cancel to return to the initial state at this time instead of entering the time duration.

Assuming the time duration is entered, an activation signal may be issued from the user terminal 50 to the watering pump 120 to direct operation thereof at operation 410. The watering pump 120 may then remain in an operating state until the time duration expires, at which time the watering pump 120 may turn off and flow returns to the initial state. However, the operator may also insert instructions to manually turn off the watering pump 120 at operation 412. A determination may then be made as to whether the manual turning off is before or overlaps with a scheduled start time at operation 414. If this manual turn off (off schedule) defines an end time that is before the scheduled next start time, the schedule may be maintained at operation 416 and the watering pump 120 may turn off at operation 420 so that flow may return to the initial state to be ready for operation again in accordance with the schedule. However, if the manual shutoff corresponds with a scheduled start time, then the schedule may be skipped at operation 418 and the watering pump 120 may turn off at operation 420 so that flow may return to the initial state to be ready for operation again when the next scheduled operating time arrives. Meanwhile, from the initial state, if the scheduled operating time is reached at operation 422, the watering pump 120 may operate at operation 410 at the corresponding time, and responsive to time expiring at operation 424, the watering pump 120 may shut off. Likewise, from the initial state, if an operation of the pump is triggered by sensor data at operation 426, the watering pump 120 may operate at operation 410 and then shut off after a predetermined period of time expires at operation 424 or when the condition clears at operation 428. Of note, the operator may also manually operates or shuts off the watering pump 120 by operating a local button or knob at the watering pump 120. If manual (local) operation is performed, the operations described above may still be performed and the times for remaining opening (or a next programmed opening) may again be governed by the schedule information input into the operation manager 340.

In some cases, the watering pump 120 may include a limited user interface in the form of a main button (or knob) provided on a front panel thereof, and a light assembly. The light assembly may include three LEDs the LEDs may be capable of expressing red, green and yellow colors in a solid or flashing manner. The LEDs may be useful for providing status information associated with attempts to pair the watering pump with another device, battery status, pump status, and/or the like.

In an example embodiment, the user interface 330 of the user terminal 50 may be employed initially to provide control console options for adding devices to the first network so that they are discovered by the gateway 40 and are recognized by the operation manager 340. When the pairing mode is initiated (e.g., by battery insertion into a deployed component, or by pressing the reset button, or by selection of an option on the user terminal 50) for the watering pump, the watering pump may be discovered by the gateway 40 and the gateway 40 may communicate the identity of the discovered watering pump to the user operation manager 340 so that information indicative of the discovered watering pump can be displayed at the user interface 330. A determination is then made as to whether pairing is possible. The user interface 330 of the user terminal 50 may also or alternatively provide an indication of detection of the watering pump. If the gateway 40 is unable to find the watering pump, LED lighting output may be generated to indicate as much. Once the gateway 40 has discovered and is able to be paired with the watering pump, the LED lighting outputs during the pairing mode may be converted to a signal strength indicator. Again similar indications could also be provided at the user terminal 50.

Figure 6A:
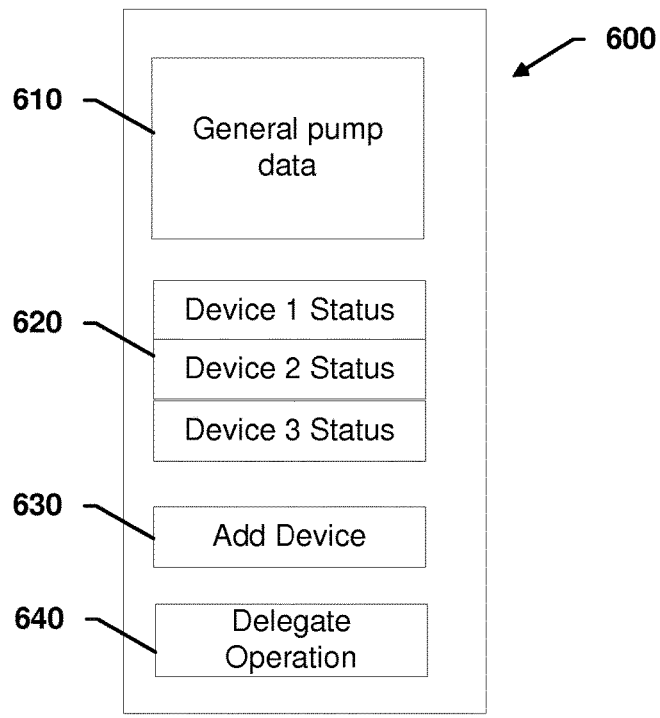
FIGS. 6A, 6B, and 6C, illustrates example interface consoles or screens that may be generated at the user terminal according to an example embodiment.
Figure 6B:
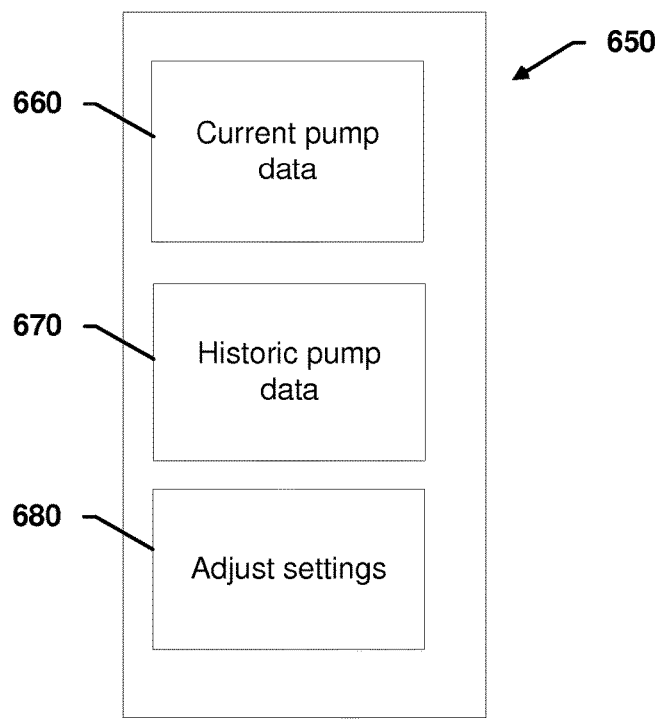
Figure 6C:
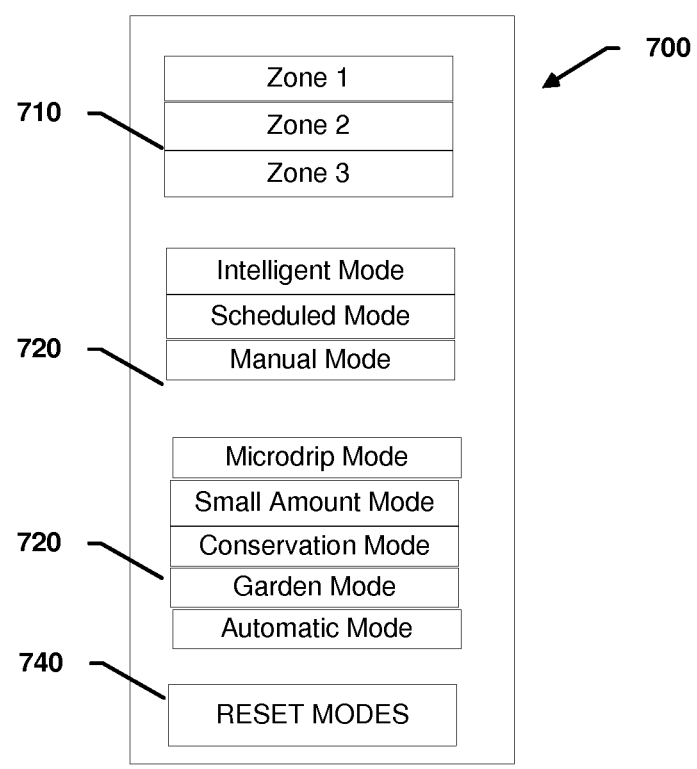

FIG. 6, which includes FIGS. 6A-6C, illustrates some examples of interface screens or control consoles that may be provided by the operation manager 340 in some embodiments. FIG. 6A illustrates a basic start screen showing a home page 600 for the app. The app may display a general watering pump data section 610, which may display runtime and usage data associated with watering pump 120. In some cases, the app may also display device status information 620, which may show each device of the first network along with corresponding status information such as, for example, battery status, operational modes, operational status, and/or the like. In an example embodiment, an option may also be provided for adding new devices in box 630. In some cases, an option may be provided for delegated operation of the system to a second user in box 640, as described above.

In some cases, by selecting the watering pump data section 610 (or an individual sensor), various individual or collective screens showing the status of each sensor may be provided. FIG. 6B illustrates an example pump status screen 650 that may be accessed responsive to selecting the watering pump data section 610. In some embodiments, the pump status screen 650 may include a current pump data section 660 that may display current pump data. A historical pump data section 670 may also be provided to show past data over a given period of time (that may be user selectable). A settings adjustment option 680 may also be provided to allow the operator to select various pump settings. The pump settings may relate to selecting operational or volume modes, pairing activity, signal strength, battery levels, identifying plant types nearby, identifying soil type and/or the like.

FIG. 6C illustrates an example device status screen 700 that may be accessed responsive to selecting the adjust settings section 680. In some embodiments, the user may be able to select what zone of the parcel the user wishes to adjust the watering settings at section 710. Once the appropriate zone is selected, the user may be able to select the operational and volume modes that the watering pump 120 is to operate in at sections 720 and 730, respectively. For example, if the user selects intelligent mode in section 720, the user may then be prompted to select the appropriate volume mode from section 730. Even after selecting the intelligent operational mode in section 720, the user may then select either or both of the scheduled or manual modes in connection with the same zone if the user desires. At section 740, the user may select the reset button in order to clear all currently stored operational and volume mode settings.

Embodiments of the present invention may therefore be practiced using one or more apparatuses such as the ones depicted in FIGS. 1-6. As such, a system of an example embodiment may include sensor equipment including one or more sensors disposed on a parcel of land, watering equipment disposed on the parcel and configured to selectively apply water to the parcel, and a gateway configured to provide for communication with the sensor equipment and the watering equipment. The watering equipment may include a watering pump operably coupled to a water source and a water line to alternately couple the water source to and isolate the water source from the water line, and processing circuitry. The processing circuitry may be configured to receive instructions from the gateway; determine, based on the first instructions received from the gateway, the operational mode of the pump; and direct the pump to operate in accordance with the operational mode.

In an example embodiment, the gateway may interface between a first network including at least the watering equipment and the sensor equipment and a second network via which a first user is enabled to wirelessly communicate with the gateway via the user terminal. In some cases, the operational mode of the pump may include one of an intelligent mode, a scheduled mode, or a manual mode. Alternatively or additionally, in the intelligent mode, the pump may operate in response to received sensor data falling within or exceeding a predefined range or threshold. Alternatively or additionally, in the scheduled mode, the pump may operate in response to a watering schedule programmed by the first user. Alternatively or additionally, the user terminal may include an interface, and, where in the manual mode, the pump may operate in response to a user selection on the interface that directs the immediate operation of the pump.

In further example embodiments, the processing circuitry may be further configured to determine, based on the first instructions received from the gateway, a volume mode of the pump. In some cases, the volume mode of the pump may include at least one of a micro drip mode, a small amount mode, a conservation mode, an automatic mode, or a garden mode. Alternatively or additionally, the processing circuitry may be further configured to determine the recommended maintenance interval of the watering pump. In some cases, the maintenance interval may be based on a predefined time period, water volume, or pump runtime. Alternatively or additionally, the maintenance interval may be a calculated interval based on a last maintenance inputted by the first user. Alternatively or additionally, the maintenance interval may be based on a time interval or water volume inputted by the first user.

In further example embodiments, the processing circuitry (160) may be further configured to detect a loss of connectivity to the gateway or the sensor, and in response to the detection of the loss of connectivity, employ a last determined operational mode and volume mode. In some cases, if the loss of connectivity to the gateway (or the sensor exceeds a predetermined time interval), the processing circuitry may be configured to employ a default operational mode and volume mode. In further example embodiments, the user terminal may include an interface displaying the status of the watering pump. Alternatively or additionally, the user terminal may be configured to provide warnings to the operator based on pump failure, battery status, schedule conflicts, and weather issues. Alternatively or additionally, the user terminal may include an interface for delegating operation of the system to a second user selected by the first user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system comprising:
   sensor equipment including one or more sensors disposed on a parcel of land;
   watering equipment disposed on the parcel of land and configured to selectively apply water to the parcel;
   a user terminal; and
   a gateway configured to communicate with the sensor equipment, the watering equipment, and the user terminal,
   wherein the watering equipment includes a watering pump, the watering pump being operably coupled to a water source and a water line to alternately couple the water source to and isolate the water source from the water line,
   wherein the watering pump comprises communication circuitry including processing circuitry for controlling the watering pump and an antenna for enabling the water pump to communicate with the gateway or the sensor,
   wherein the processing circuitry of the watering pump is configured to:
      determine a user-selected operational mode of the watering pump; and
      direct the watering pump to operate in accordance with the user-selected operational mode, the user-selected operational mode controlling an on/off cycle for the watering pump based on sensor data received from the sensor equipment,
      locally store default settings indicating a default operational mode and the last received instructions for the user-selected operational mode from a user,
      detect a loss of connectivity to the gateway or the sensor, and
      in response to the detection of the loss of connectivity:
         continue to implement the user-selected operational mode; and
         in response to passage of a threshold time period after the loss of connectivity, switch to the default operational mode indicated by the default settings, the default operational mode controlling the on/off cycle for the watering pump based on a schedule and not based on the sensor data received from the sensor equipment.

2. The system of claim 1, wherein the user-selected operational mode is an intelligent operational mode or an automatic volume mode.

3. The system of claim 1, wherein the gateway interfaces between a first network comprising at least the watering equipment and the sensor equipment and a second network via which the user is enabled to wirelessly communicate with the gateway via the user terminal.

4. The system of claim 3, wherein the user-selected operational mode of the watering pump is an intelligent operational mode, or an intelligent operational mode combined with a scheduled mode.

5. The system of claim 4, wherein the user-selected operational mode is the intelligent operational mode and the watering pump operates in response to the sensor data falling within or exceeding a predefined range or threshold.

6. The system of claim 4, wherein the user-selected operational mode is the intelligent operational mode combined with the scheduled mode and the watering pump operates in response to a watering schedule programmed by the user and based on the sensor data.

7. The system of claim 4, wherein the user terminal includes an interface, and, wherein in a manual mode, the watering pump operates in response to a user selection by the user on the user interface that directs the immediate operation of the watering pump.

8. The system of claim 1, wherein the processing circuitry is further configured to determine a user-selected volume mode of the watering pump, the user-selected volume mode being one of one of a micro drip mode, a small amount mode, a conservation mode, an automatic mode, or a garden mode.

9. The system of claim 3, wherein the processing circuitry is further configured to determine a recommended maintenance interval of the watering pump.

10. The system of claim 9, wherein the maintenance interval is based on a predefined time period, a water volume, or a pump runtime.

11. The system of claim 9, wherein the maintenance interval is a calculated interval based on a last maintenance inputted by the user.

12. The system of claim 9, wherein a maintenance interval is based on a time interval or a water volume inputted by the user.

13. The system of claim 1, wherein the user terminal includes an interface displaying a status of the watering pump.

14. The system of claim 1, wherein the user terminal is configured to provide warnings to the user based on pump failure, a battery status, schedule conflicts, and weather issues.

15. The system of claim 1, wherein the user is a first user, and wherein the user terminal includes an interface for delegating operation of the system to a second user selected by the first user.

16. A watering pump for the system of claim 1.

17. The system of claim 4, wherein the processing circuitry, when the watering pump is operating with the user-selected operational mode being the intelligent operation mode and independent of connectivity to the gateway or the sensor network, is configured to determine a time to water and a volume of water to be supplied by the watering pump to the parcel of land based on the last sensor data received from the sensor equipment.

* * * * *